Figure 1A:
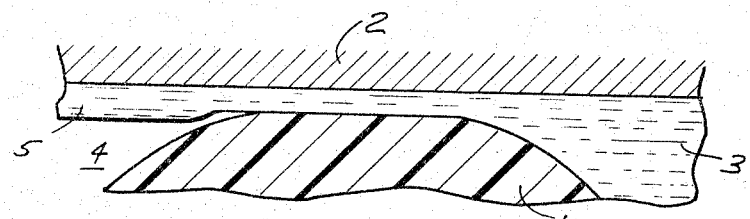

April 25, 1967 A. R. ÅHBECK 3,315,972
SEALING ELEMENT FOR SEALING TWO RELATIVELY
MOVABLE MEMBERS AGAINST EACH OTHER
Filed Oct. 19, 1964 2 Sheets-Sheet 2
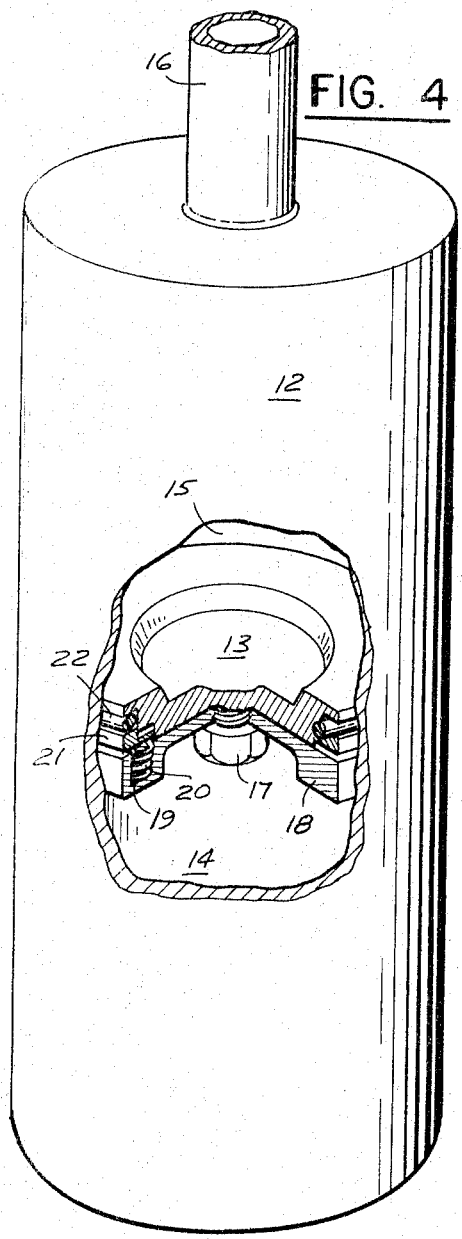
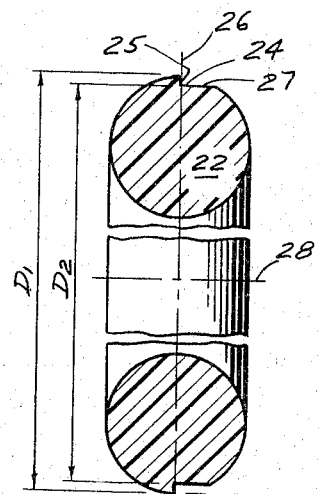
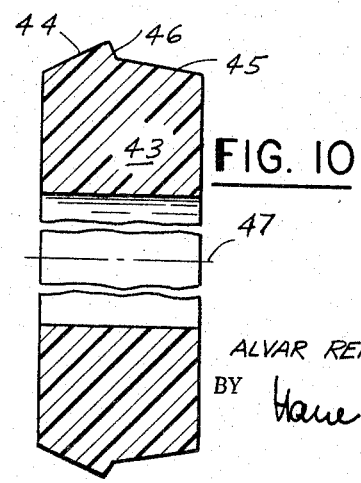
INVENTOR.
ALVAR REINHOLD ÅHBECK
BY Hane and Nydick
ATTORNEYS 3,315,972
SEALING ELEMENT FOR SEALING TWO RELATIVELY MOVABLE MEMBERS AGAINST EACH OTHER
Alvar Reinhold Åhbeck, Karlskoga, Sweden, assignor to Aktiebolaget Bofors, Bofors, Sweden, a Swedish corporation
Filed Oct. 19, 1964, Ser. No. 404,983
Claims priority, application Sweden, Oct. 26, 1963, 11,803/63
3 Claims. (Cl. 277—237)

The present invention relates to a seal for sealing a reciprocating movement between two members which can be displaced in relation to each other, and more particularly to a sealing device of the type where one of the members is provided with a ring-formed sealing element of an elastic material. Such seals are used, for instance, for pistons which can be displaced in a cylinder and for shafts with a reciprocating movement. In these cases, O-rings are often used. However, the use of such rings often permits a comparatively great leakage over the seal. If it be attempted to reduce the leakage by increasing the pressure between the O-ring and the sealing surface, the friction will increase considerably and the life of the seal will be considerably shorter, particularly when the seal is used at comparatively high speeds of the members.

With the present invention the above-mentioned disadvantages are eliminated entirely, and by using the seal according to the invention it is possible to obtain a seal with very insignificant leakage but with extremely long life even for comparatively high speeds of the members.

The seal for the reciprocating movement between two members which can be displaced in relation to each other, and one of which is provided with a ring-formed sealing element of an elastic material, is characterized according to the present invention in that the part of the ring-formed sealing element which is to bear against the sealing surface of the member which is not provided with the sealing element shows a stepped change in dimensions oriented mainly at right angles to the sealing surface. The seal can be used to separate two mediums with different pressures or different viscosities, and the part of the ring-formed sealing element which through the stepped change in its dimensions has obtained the smaller diameter is then to be directed towards the medium with the higher pressure or the higher viscosity. It is advisable to have the ring-formed sealing element arranged so that it can only turn slightly at the reciprocating movement. This can be achieved, for instance by securing the sealing element in place by means of a spring-loaded ring. The stepped change in dimensions can take place along a plane which is at right angles to the ring-formed symmetry axis of the sealing element, or along a conical surface which forms a comparatively small angle to said plane. The greater of the diameters adjacent to the stepped change in dimensions should lie within the contact surface of the ring-formed sealing element against the sealing surface. Said greater diameter can at the same time be the maximum diameter of the sealing element, or can be close to the last-mentioned maximum diameter of the sealing element. Either or both of the parts of the ring-formed sealing element located on either side of the stepped change in dimensions and facing the sealing surface can be made with generally circular cross-sections or with conical limiting surfaces. It may be advisable to make the part of the ring-formed sealing element facing the sealing surface with a generally circular cross-section, and the part of the ring-formed sealing element which is to bear against the sealing surface with an encircling recess, formed in such a way that the elastic material of which the ring-formed sealing element consists has been removed within a section limited by a plane at right angles to the symmetry axis of the ring-formed sealing element and a cylindrical surface which is concentrical with the same axis of symmetry. The encircling recess can be located on the outside or the inside of the ring-formed sealing element. The difference between the greatest and the smallest of the diameters adjacent to the stepped change in dimensions should preferably amount to between 0.1 and 1 mm. The part of the ring-formed sealing element which is turned away from the sealing surface may be made with a mainly circular cross-section, but this part may also be made with a mainly rectangular cross-section, where two opposite sides should preferably be nearly at right angles to the sealing surface.

The invention will now be described in more detail with reference to the figures shown in the attached drawings. Of these figures, 1a and 1b and 2a and 2b show the contact and the contact pressure of conventional O-rings, and FIGS. 3a and 3b the corresponding conditions for a seal according to the present invention. In FIG. 4 an example of a seal according to the invention is shown, in perspective and partly cut away, and FIG. 5 shows, on a somewhat larger scale, a cross-section of a part of the application example according to FIG. 4. FIGS. 6–10, finally, show cross-sections of some different designs of ring-formed sealing elements according to the invention, on an enlarged scale, but with the length reduced vertically.

Figure 1B:
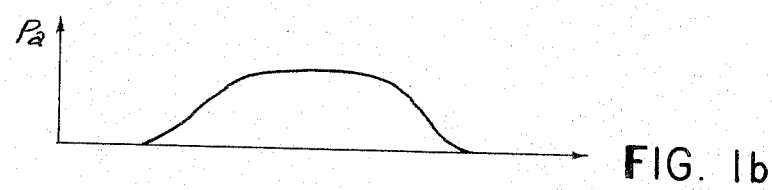
Figure 2A:
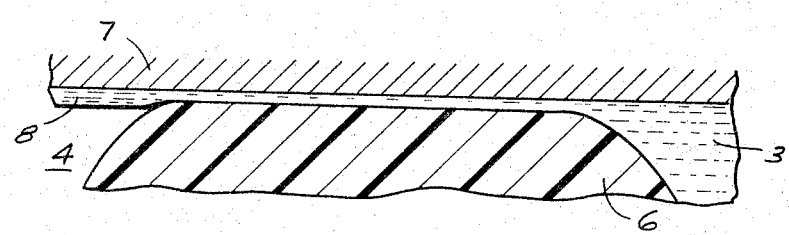
Figure 2B:
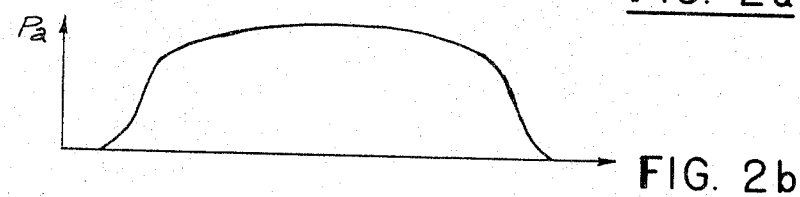
Figure 3A:
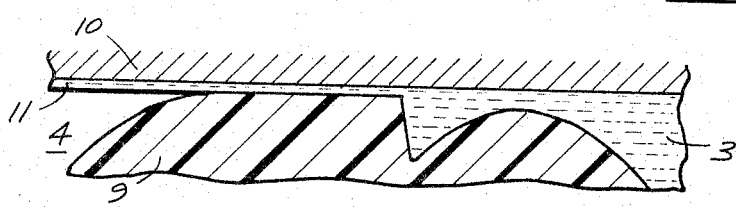
Figure 3B:
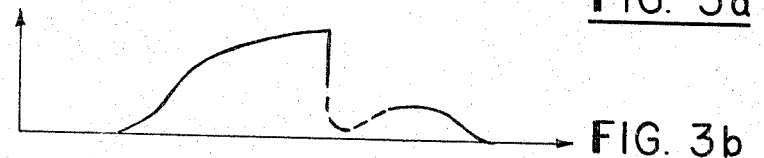

FIG. 1a shows, in cross-section and one enlarged scale, how an O-ring 1 is deformed when it bears against a sealing surface 2. In this case, the O-ring is to constitute a seal between oil 3 to the right of the O-ring and gas 4 to the left of the O-ring. At a reciprocating movement of the sealing ring 1 in relation to the sealing surface 2, an oil film 5 will be formed and this oil film 5 causes a certain amount of leakage. FIG. 1b shows schematically how the contact pressure $P_a$ varies along the contact surface. In FIG. 2a another O-ring 6 is shown, which bears against the sealing surface 7, and where the contact is considerably greater than that shown in FIG. 1a and, as shown by FIG. 2b, the contact pressure will be considerably greater than in FIG. 1b. In this case, the oil film 8 will be considerably smaller than in the case shown in FIG. 1a, and this results in considerably less leakage. In the case shown in FIG. 2a, however, both the contact pressure and the length of the contact surface will be comparatively great, and in practice this has the result that the friction will be quite considerable and the life of the seal will consequently be very short. FIG. 3a shows a ring-formed sealing element 9, made according to the present invention, which bears against the sealing surface 10. In this case the oil film 11 will be very thin and the leakage will therefore be very insignificant. As will be noted from FIG. 3b, the contact pressure and the length of the contact surface of the sealing element will moreover be comparatively moderate, which in practice gives extremely good life of the sealing element and at the same time as the leakage will be insignificant.

FIG. 4 shows the use of a seal according to the present invention in a hydraulic accumulator. The pressure accumulator consists of a cylinder 12 in which a freely running piston 13 is movably arranged. Through this freely running piston 13, the contents of the cylinder 12 are divided into two spaces, of which the lower one 14 is filled with nitrogen gas and the upper one 15 with oil. Via the pipe 16, the oil in the oil-filled chamber 15 is connected with a hydraulic system which is not shown. A disk 18 is attached to the freely running piston 13 by means of a screw 17. This disk 18 has an appropriate number (at least three) of recesses 19, in which helical springs 20, which act upon a ring 21 are placed. The ring 21, in turn, acts upon a ring-formed sealing element 22, which consists of an elastic material. The ring-formed sealing element 22 is placed in an annular groove 23 (see FIG. 5) in the piston 13. FIG. 6 shows, on a larger scale, a cross-section through the ring-formed element 22. As will be noted from FIG. 6, the elastic ring-formed sealing element 22 has a substantially circular cross-section except for an encircling recess 24 along the outer edge of the ring-formed sealing element. The recess 24 has a limiting surface 25, which is in a plane 26, extending through the center of the cross-section. The plane is at right angles to the symmetry axis 28 of the sealing element 22 and a cylindrical limiting surface 27 which is coaxial with the symmetry axis 28 of the sealing element 22. The sealing element 22 is located so that the recess 24 is directed towards the oil-filled space 15.

FIG. 7 shows an alternative design 29 of the elastic, ring-formed sealing element. This sealing element 29 is provided with an encircling recess 24 in the same way as the sealing element 22, but the part facing the centre of the sealing element has a rectangular cross-section, and the two opposite sides 30 and 31 are thus substantially at right angles to the symmetry axis 32, while the cylindrical surface 33 is coaxial with the axis 32. FIG. 8 shows a further design 34 of the elastic, ring-formed sealing element. This design 34, like the sealing element 22, has a substantially circular cross-section, and is provided with an encircling recess 24a, which recess, however, in the sealing element 34, is located on the part facing the symmetry axis 35 of the sealing element 34. This sealing element 34 is intended for sealing shafts with a reciprocating movement.

FIG. 9 shows a sealing element 36, where the part facing the sealing surface is built up of two surfaces 37 and 38, both of which have circular cross-sections. Both of the surfaces 37 and 38 have the same radius of curvature R, but the centers are displaced somewhat in relation to each other in such a way that the centre 39 of the circular cross-section of the surface 37 is at a somewhat greater distance from the symmetry axis 40 of the seal 36 than the centre 41 of the circular cross-section of the surface 38. This results in a step 42. In FIG. 10, finally, the part of a sealing element 43 facing the sealing surface consists of the two conical surfaces 44 and 45, between which a stepped conically disposed surface 46 with a comparatively large angle to the symmetry axis 47 of the sealing element 43 is arranged. This conical surface 46 forms a step which is not in a plane at right angles to the symmetry axis 47 of the sealing element 43.

In the example of application shown in FIG. 4, the inside diameter of the cylinder 12 is 120 mm., and the freely running piston 13 is pressed in against this with a play of approx. 150μ. The sealing element 22 which has been inserted is made of nitrile rubber, and has a diameter of the circular cross-section of 5.7 mm. The encircling recess 24 has such a depth that the difference between the maximum diameter $D_1$ of the sealing element 22 and the diameter $D_2$ of the cylindrical surface 27 is approximately 0.6 mm. This difference should be between 0.1 and 1 mm. Also the recesses 24 shown in FIGS. 7 and 8 and the changes in dimensions 42 and 46 shown in FIGS. 9 and 10 should be as much as this. Thus, in FIG. 8, the difference between the minimum diameter $D_3$ of the sealing element 34 and the diameter $D_4$ will be between 0.1 and 1 mm.

The device shown in FIG. 4 functions in such a way that shocks arising from the reciprocating oil flow in the pipe 16 will be dampened through a displacement of the freely running piston 13. The device according to FIG. 4 equipped with any of the sealing elements according to the invention has been subjected to systematic testing in a special device, where a reciprocating oil flow with 5 complete oscillations per second has been allowed to pass through the pipe 16, with a quantity which had a speed of approximately 1 m. per second of the piston 13. The length of stroke was ±30 mm. and the pressure of the oil in the space 15 and the nitrogen gas in the space 14 varied between 30 and 50 kg./cm.² The device was operated in this way for 100 hours, after which time there was no noticeable leakage, nor was there any noticeable wear of the sealing element 22. In similar tests, when O-rings of a conventional design had been used instead of the sealing element 22, it was found that if it was desired to avoid any major leakage, it was necessary to make the O-ring bear so heavily against the sealing surface that, owing to the friction which arose, the seal was completely ruined after only a short time. At another test, the pressure was allowed to vary between 50 and 160 kg./cm.² at a length of stroke of ±80 mm. and 1½ oscillation per second. Also in this test, the device according to the present invention proved to function entirely satisfactorily after 100 hours.

A great advantage of the sealing elements 22 and 34, shown in FIGS. 6 and 8, respectively, is that that these can be comparatively easily made from conventional O-rings. Design 29 according to FIG. 7 is particularly valuable when it proves to be difficult to avoid a turning of the sealing element at the reciprocating movement. In this connection, it may be pointed out that it is not at all necessary to use a spring-loaded ring 21 to keep the elastic, ring-formed sealing element in position, but that it is often sufficient to have an appropriately made groove in the member which is to be provided with the sealing element.

Sealing element 9 of FIG. 3a is generally similar to sealing elements 22, 29, 34, 36 or 43 and may be used in a similar fashion.

I claim:
1. A sealing device for sealing two relatively movable members against each other, said sealing device comprising a hollow generally cylindrical member; a piston fitted in said cylindrical member freely slidable therein, said piston having in its outer peripheral wall an annular groove; and a solid sealing ring made of elastic material fitted in said groove, said ring having at its outer peripheral wall two juxtaposed circumferential surface portions radially stepped in reference to each other, one of said surface portions having at least partially a smaller diameter than the other, the facing edges of said surface portions being joined by a generally radially directed surface, the surface portion having the larger diameter deforming against an adjacent wall portion of the cylindrical member thereby sealing the piston against said member and the surface portion having the smaller diameter restricting fluid flow.

2. A sealing device according to claim 1 wherein an annular substantially rigid member is fitted in said groove in radial alignment with the elastic ring therein, and wherein a spring means is supported in the second member and positioned to press said annular member against the ring and the ring against a boundary wall of said groove thereby retaining the ring in the groove.

3. A sealing device according to claim 2 wherein said piston defines two chambers in said cylindrical member, said chambers being adapted to receive media of a differential viscosity, the surface portion having a smaller diameter facing the chamber adapted to receive the medium having the higher viscosity.

References Cited by the Examiner
UNITED STATES PATENTS

| | | | |
|---|---|---|---|
| 2,046,724 | 7/1936 | Buffington | 277—237 X |
| 2,335,561 | 11/1943 | Dodge | 277—183 |
| 2,863,681 | 12/1958 | Robbins | 277—237 X |

FOREIGN PATENTS 451,385  10/1927  Germany.

LAVERNE D. GEIGER, Primary Examiner.

J. S. MEDNICK, Assistant Examiner.